(12) United States Patent
Lintilhac

(10) Patent No.: US 12,406,272 B2
(45) Date of Patent: *Sep. 2, 2025

(54) SYSTEMS AND METHODS FOR PROVIDING A DECENTRALIZED ANTI-COUNTERFEIT SOLUTION FOR SUPPLY CHAIN TRACKING USING SINGLE-USE CODES

(71) Applicant: Trace Labs LLC, Shelburne, VT (US)

(72) Inventor: Paul Lintilhac, Springfield, VT (US)

(73) Assignee: Trace Labs LLC, Shelburne, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,068

(22) Filed: Apr. 26, 2024

(65) Prior Publication Data
US 2024/0273554 A1 Aug. 15, 2024

Related U.S. Application Data

(63) Continuation of application No. 16/894,557, filed on Jun. 5, 2020, now Pat. No. 11,972,440.

(51) Int. Cl.
*G06Q 30/018* (2023.01)
*G06F 16/27* (2019.01)
(Continued)

(52) U.S. Cl.
CPC ......... *G06Q 30/0185* (2013.01); *G06F 16/27* (2019.01); *H04L 9/0643* (2013.01); *H04L 9/0866* (2013.01); *G06Q 2220/00* (2013.01)

(58) Field of Classification Search
CPC ........... G06Q 30/0185; G06Q 2220/00; G06Q 30/018; G06F 16/27; G06F 16/9032; H04L 9/0643; H04L 9/0866; H04L 9/50
See application file for complete search history.

(56) References Cited

U.S. PATENT DOCUMENTS 6,859,650 B1 * 2/2005 Ritter .................... G07F 7/1008
455/500
8,032,397 B2 * 10/2011 Lawless ................. G16H 40/67
705/2

(Continued)

FOREIGN PATENT DOCUMENTS

| EP | 2894596 A1 * | 7/2015 | ........... G06Q 30/018 |
| EP | 3539885 A1 * | 9/2019 | ............... B65B 3/02 |
| WO | WO-2015197494 A1 * | 12/2015 | ............. G06K 1/121 |

*Primary Examiner* — Neha Patel
*Assistant Examiner* — Jahed Ali
(74) *Attorney, Agent, or Firm* — Esplin & Associates, PC

(57) ABSTRACT

Systems and methods for providing a decentralized anti-counterfeit solution for supply chain tracking are disclosed. Exemplary implementations may: electronically store a product identifier that identifies a physical product; generate a secret code that is packaged with the physical product in a tamper-evident manner; generate a one-way encrypted code based on the secret code and the product identifier; create an asset that includes code executable by a decentralized database; record the asset on a decentralized database; record the one-way encrypted code in the asset; receive a request for verification regarding a given physical product; generate a given one-way encrypted code based on the request; determine whether the given one-way encrypted code is a match of the one-way encrypted code as recorded in the asset; responsive to a match, return a notification to the given user and remove the one-way encrypted code from the asset.

20 Claims, 3 Drawing Sheets

(51) Int. Cl.
*H04L 9/06* (2006.01)
*H04L 9/08* (2006.01)

(56) References Cited

U.S. PATENT DOCUMENTS

| | | | | |
|---|---|---|---|---|
| 8,219,811 | B2* | 7/2012 | Roundtree | H04M 1/72406 |
| | | | | 713/184 |
| 10,102,526 | B1* | 10/2018 | Madisetti | G06Q 20/389 |
| 10,176,481 | B2* | 1/2019 | Aljawhari | H04L 9/3236 |
| 10,325,428 | B1* | 6/2019 | Kurian | G07C 9/00571 |
| 10,412,086 | B1* | 9/2019 | Lintilhac | G06F 16/9024 |
| 10,454,918 | B1* | 10/2019 | Uhr | H04L 63/126 |
| 10,585,882 | B1* | 3/2020 | Lintilhac | H04L 9/3247 |
| 11,294,889 | B2* | 4/2022 | Lintilhac | G06F 16/9024 |
| 11,308,484 | B2* | 4/2022 | Smirnov | G06Q 20/065 |
| 11,870,847 | B2* | 1/2024 | Todd | G06F 16/27 |
| 2005/0073650 | A1* | 4/2005 | Ito | B29D 11/00961 |
| | | | | 351/200 |
| 2005/0144132 | A1* | 6/2005 | Lin | G06Q 10/10 |
| | | | | 235/375 |
| 2006/0100964 | A1* | 5/2006 | Wilde | G06Q 30/0283 |
| | | | | 705/57 |
| 2011/0274275 | A1* | 11/2011 | Seitz | G06Q 10/08 |
| | | | | 235/492 |
| 2013/0117245 | A1* | 5/2013 | Robinson | G06F 16/2474 |
| | | | | 707/E17.005 |
| 2015/0186393 | A1* | 7/2015 | Serlet | G06F 16/1752 |
| | | | | 707/828 |
| 2015/0317644 | A1* | 11/2015 | Chanez | G09C 5/00 |
| | | | | 705/51 |
| 2016/0321677 | A1* | 11/2016 | Dobaj | G06Q 30/0185 |
| 2017/0027977 | A1* | 2/2017 | Bahjat | A61K 31/7084 |
| 2017/0048235 | A1* | 2/2017 | Lohe | G06Q 50/01 |
| 2017/0109549 | A1* | 4/2017 | Fradet | H04L 9/0618 |
| 2017/0171187 | A1* | 6/2017 | Yin | H04L 63/083 |
| 2017/0243215 | A1* | 8/2017 | Sifford | G06Q 20/401 |
| 2017/0257358 | A1* | 9/2017 | Ebrahimi | H04L 9/3236 |
| 2018/0191503 | A1* | 7/2018 | Alwar | H04L 9/3242 |
| 2018/0260212 | A1* | 9/2018 | Wisnovsky | G06F 16/134 |
| 2018/0337781 | A1* | 11/2018 | Frankel | H04L 63/123 |
| 2018/0343126 | A1* | 11/2018 | Fallah | H04L 9/3297 |
| 2019/0019180 | A1* | 1/2019 | Coburn | H04L 9/3213 |
| 2019/0050855 | A1* | 2/2019 | Martino | G06F 16/182 |
| 2019/0087598 | A1* | 3/2019 | Adkins | H04L 9/3268 |
| 2019/0109877 | A1* | 4/2019 | Samuel | H04W 4/70 |
| 2019/0205894 | A1* | 7/2019 | Gonzales, Jr. | H04L 9/3247 |
| 2019/0213462 | A1* | 7/2019 | McDonald | G06K 19/06168 |
| 2019/0251124 | A1* | 8/2019 | Pan | H04L 9/0637 |
| 2019/0266145 | A1* | 8/2019 | Qiu | G06Q 20/02 |
| 2019/0288850 | A1* | 9/2019 | Beecham | G06F 21/6209 |
| 2019/0324958 | A1* | 10/2019 | Ow | H04L 9/3247 |
| 2019/0325432 | A1* | 10/2019 | Ow | G06Q 20/3678 |
| 2019/0332921 | A1* | 10/2019 | Rodriguez | H04L 9/0643 |
| 2019/0356609 | A1* | 11/2019 | Grunwald | G06F 3/067 |
| 2019/0372770 | A1* | 12/2019 | Xu | H04L 9/0643 |
| 2020/0026699 | A1* | 1/2020 | Zhang | H04L 9/0643 |
| 2020/0045538 | A1* | 2/2020 | Dattawadkar | H04L 9/50 |
| 2020/0074552 | A1* | 3/2020 | Shier | G06Q 20/10 |
| 2020/0084046 | A1* | 3/2020 | Bessonov | H04L 9/321 |
| 2020/0098072 | A1* | 3/2020 | Escobar | G06Q 10/06 |
| 2020/0117818 | A1* | 4/2020 | Latka | H04L 67/1097 |
| 2020/0143031 | A1* | 5/2020 | Hayton | G06F 21/602 |
| 2020/0160320 | A1* | 5/2020 | Williams | H04L 9/0897 |
| 2020/0162244 | A1* | 5/2020 | Wang | G06Q 20/3829 |
| 2020/0175002 | A1* | 6/2020 | Cheng | G06F 16/2379 |
| 2020/0175554 | A1* | 6/2020 | Vukich | H04L 9/3239 |
| 2020/0250176 | A1* | 8/2020 | Padmanabhan | H04L 9/3239 |
| 2020/0259653 | A1* | 8/2020 | Endress | H04L 9/50 |
| 2021/0012278 | A1* | 1/2021 | Alon | G06Q 10/087 |
| 2021/0192039 | A1* | 6/2021 | Pihur | H04L 51/52 |
| 2021/0344498 | A1* | 11/2021 | Perunov | H04L 63/08 |
| 2022/0222248 | A1* | 7/2022 | Lintilhac | G06F 16/27 |
| 2023/0334041 | A1 | 10/2023 | Lintilhac | |

* cited by examiner

SYSTEMS AND METHODS FOR PROVIDING A DECENTRALIZED ANTI-COUNTERFEIT SOLUTION FOR SUPPLY CHAIN TRACKING USING SINGLE-USE CODES

CROSS-REFERENCE TO RELATED APPLICATIONS

This application incorporates U.S. Pat. No. 10,412,086 in its entirety.

FIELD OF THE DISCLOSURE

The present disclosure relates to systems and methods for providing a decentralized anti-counterfeit solution for supply chain tracking, using single-use codes.

BACKGROUND

Supply chain tracking is known. Centralized anti-counterfeiting solutions are known. Ledgers are known.

SUMMARY

One aspect of the present disclosure relates to a system configured for providing a decentralized anti-counterfeit solution for supply chain tracking. The system may include electronic storage, one or more hardware processors configured by machine-readable instructions, and/or other components. The electronic storage may be configured to electronically store information. The stored information may include a product identifier that identifiers a physical product. The processor(s) may be configured to generate a secret code. The secret code may be packaged in a packaging with the physical product in a tamper-evident manner, such that the secret code is hidden from public view until the physical product is unpackaged by a user. The processor(s) may be configured to generate a one-way encrypted code. Generation of the one-way encrypted code may be based on the secret code and the product identifier. The processor(s) may be configured to create an asset that includes code executable by a decentralized database. The asset may have an asset identifier. The asset may represent ownership of the physical product. The processor(s) may be configured to record the asset on a decentralized database. The processor(s) may be configured to record the one-way encrypted code in the asset on the decentralized database. The processor(s) may be configured to receive, from a given user, a request for verification regarding a given physical product. The request may include a given secret code associated with the given physical product and a given asset identifier associated with the given physical product. Receipt of the request may effectuate execution by the asset of one or more functions. The one or more functions may be configured to generate a given one-way encrypted code based on the given secret code and the given asset identifier. The one or more functions may be configured to determine whether the given one-way encrypted code is a match of the one-way encrypted code as recorded in the asset. The one or more functions may be configured, responsive to a determination of the given one-way encrypted code not being a match, to return a notification to the given user that represents the request for verification failed. The one or more functions may be configured, responsive to a determination of the given one-way encrypted code being a match, to return a second notification to the given user that represents the request for verification succeeded, and further to remove the one-way encrypted code from the asset.

Another aspect of the present disclosure relates to a method for providing a decentralized anti-counterfeit solution for supply chain tracking. The method may include electronically storing information. The information may include a product identifier that identifies a physical product. The method may include generating a secret code. The secret code may be packaged in a packaging with the physical product in a tamper-evident manner, such that the secret code is hidden from public view until the physical product is unpackaged by a user. The method may include generating a one-way encrypted code. Generation of the one-way encrypted code may be based on the secret code and the product identifier. The method may include creating an asset that includes code executable by a decentralized database. The asset may have an asset identifier. The asset may represent ownership of the physical product. The method may include recording the asset on a decentralized database. The method may include recording the one-way encrypted code in the asset on the decentralized database. The method may include receiving, from a given user, a request for verification regarding a given physical product. The request may include a given secret code associated with the given physical product and a given asset identifier associated with the given physical product. Receipt of the request may effectuate the asset to perform a set of steps. The set of steps may include generating a given one-way encrypted code based on the given secret code and the given asset identifier. The set of steps may include determining whether the given one-way encrypted code is a match of the one-way encrypted code as recorded in the asset. The set of steps may include, responsive to a determination of the given one-way encrypted code not being a match, returning a notification to the given user that represents the request for verification failed. The set of steps may include, responsive to a determination of the given one-way encrypted code being a match, returning a second notification to the given user that represents the request for verification succeeded, and further removing the one-way encrypted code from the asset.

As used herein, any association (or relation, or reflection, or indication, or correspondency) involving servers, processors, client computing platforms, computing devices, databases, products, packages, packagings, identifiers, codes, assets, functions, requests, hash values, digital signatures, users, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
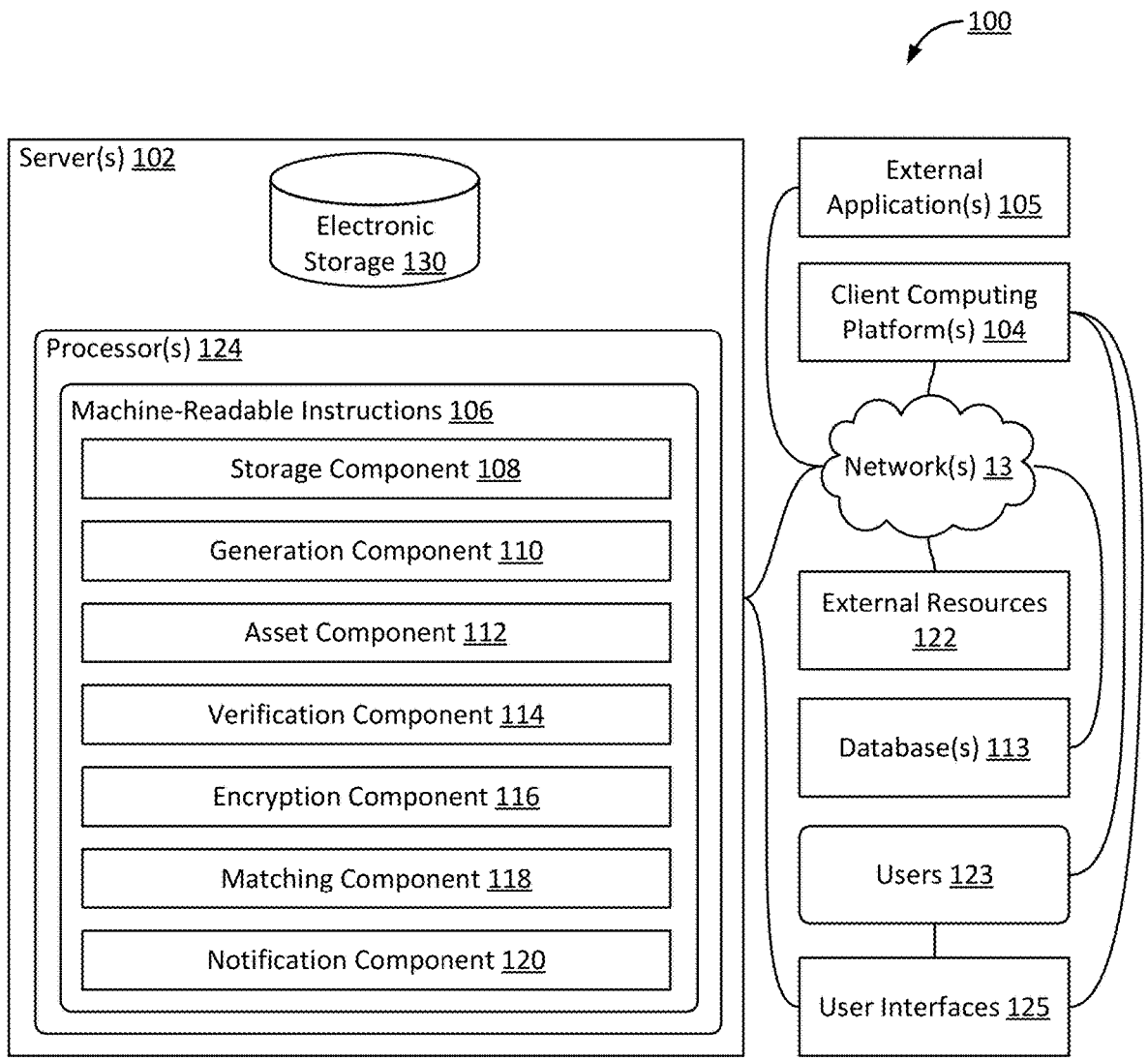
FIG. 1 illustrates a system configured for providing a decentralized anti-counterfeit solution for supply chain tracking, in accordance with one or more implementations.

FIG. 1 illustrates a system 100 configured for providing a decentralized anti-counterfeit solution for supply chain tracking, using single-use codes, in accordance with one or more implementations. In supply chains, products may be transferred from and/or distributed by producers or productizers, via one or more intermediaries, to consumers or end-users. As used herein, consumers may be downstream from producers, and producers may be upstream from consumers. Consumers may want to trust (or be able to trust) the producers regarding the contents, quality, and/or integrity of the products, in particular for pharmaceutical products. In particular, the consumers and producers may want to be protected against counterfeit products. Consumers may want to be able to hold producers accountable for the contents, quality, and/or integrity of the products. For example, a consumer may demand accountability for information regarding a given product and/or package (e.g., a label) matching its content. Producers may wish for relationships with consumers based on trust and experience. However, neither party may be able to trust or control the one or more intermediaries. Often, tracking of products in a supply chain relies on a centralized service and/or party (e.g., using a centralized server). However, for some types of products and/or some types of supply chains, consumers and/or producers may prefer a decentralized mechanism to protect against counterfeit products, as described in this disclosure.

In some implementations, system 100 may include one or more servers 102, one or more client computing platforms 104, one or more databases 113, electronic storage 130, external resources 122, user interfaces 125, one or more external applications 105, and/or other components. In some implementations, one or more databases 113 may include one or more decentralized databases.

Databases 113 may be configured to facilitate sharing information among users 123 in different physical locations, using different computing devices and/or platforms. Decentralized databases may be configured to facilitate sharing control and/or hosting responsibilities of shared information among multiple users, e.g., to prevent a single point of failure. Ledgers may produce a secure record or registry of ownership of assets, transactions, and other information. A database may include a ledger, and a ledger may be implemented as a database. For example, a blockchain is a type of ledger, as well as a type of decentralized database that stores a registry of assets and transactions. Blockchain technology may be used for cryptocurrencies, smart contracts, and/or other applications for a decentralized database. In some implementations, database 113 may include and/or implement a blockchain. In some implementations, database 113 may be configured to store a registry of assets, transactions, and/or other information.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. Users 123 may include a first user, a second user, a third user, a fourth user, and so forth. In some implementations, users 123 may be referred to as producing users, intermediary users, consuming users, and/or other types of users, based on their roles in a supply chain of one or more products. Client computing platforms 104 may include a first client computing platform, a second client computing platform, a third client computing platform, a fourth client computing platform, and so forth. The first client computing platform may be associated with the first user, and/or vice versa. The second client computing platform may be associated with the second user, and/or vice versa. The third client computing platform may be associated with the third user, and/or vice versa. The fourth client computing platform may be associated with the fourth user, and/or vice versa, and so forth. Numbering users, client computing platforms, requests, and/or any other entity, action, or object that interacts with any part of system 100 and/or plays a part in the operation of system 100 merely serves to distinguish different entities, actions, or objects, and does not imply an ordering or hierarchy unless expressly stated.

In some implementations, individual client computing platforms 104 may be associated with one or more cryptographic keys. For example, a particular computing device may be associated with a key pair of cryptographic keys that includes a public cryptographic key and a private cryptographic key to facilitate public-private key encryption and decryption.

Referring to FIG. 1, in some implementations, database 113 (e.g., a blockchain or another structure of recorded transactions and/or blocks) may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts. In some implementations, objects in the runtime environment may be considered as existing in a code space. For example, deploying and/or instantiating a new object may be interpreted as adding the new object to the code space. In some implementations, a change to a particular object in the runtime environment may be interpreted as a change in the code space, e.g., a change to the state of the particular object. In some implementations, the distributed computing platform may include electronic storage configured to store part or all of database 113. For example, smart contracts may be stored on database 113. In some implementations, the distributed computing platform may be the EOSIO platform. In some implementations, the distributed computing platform may be Ethereum. In some implementations, the virtual machine may be a Turing-complete and/or decentralized virtual machine.

Database 113 may store a registry of assets and transactions across one or more networks 13, including but not limited to the internet and/or other networks. Assets may be owned by users 123. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights. Tokens are a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in the distributed computing platform, e.g., in the operation of database 113.

In some implementations, database 113 may record ownership of assets. Alternatively, and/or simultaneously, database 113 may record transactions that modify ownership of assets. A smart contract may be a type of asset. In some implementations, once a smart contract has been added to database 113, the smart contract may be referred to as published, posted, and/or recorded. In some implementations, elements of database 113 may be grouped together in units that are referred to as blocks. Individual blocks may be linked or chained together to form a structure of blocks and/or a hierarchy of blocks, such as, e.g., a chain of blocks. An individual block may include one or more assets and one or more transactions. In some implementations, elements of database 113 may be linked together in a manner that prevents tampering, such as, e.g., a hash chain. Individual elements and/or transactions may be linked or chained together to form a structure and/or a hierarchy of elements and/or transactions.

In some implementations, database 113 may be publicly accessible and append-only. In some implementations, existing blocks of database 113 can substantially not be altered or deleted, unless multiple copies of the database are altered. This is unlikely to happen provided that multiple copies and/or versions of the database are stored on different computing platforms, e.g., in different geographical locations. In some implementations, database 113 may be replicated on multiple computing platforms, preferably in multiple different geographical locations. As used herein, the term "distributed" refers to multiple computing platforms located in multiple separate and distinct geographical locations operating together to provide particular functionality, such as, e.g., in the case of a particular distributed database, the functionality of a blockchain.

Server(s) 102 may be configured by machine-readable instructions 106. Machine-readable instructions 106 may include one or more instruction components. The instruction components may include computer program components. The instruction components may include one or more of a storage component 108, a generation component 110, an asset component 112, a verification component 114, an encryption component 116, a matching component 118, a notification component 120, and/or other instruction components.

Storage component 108 may be configured to electronically store information. In some implementations, stored information may be associated with (physical) products, including but not limited to pharmaceutical products. For example, stored information may include product identifiers that identify products. For example, stored information may include producer identifiers that identify producers and/or distributors of particular products. In some implementations, one or more products may be packaged in one or more packages (using one or more packagings). In some implementations, information may be stored in electronic storage 130. In some implementations, product identifiers may be sequences of alphanumerical characters. In some implementations, product identifiers may be (or include) a human-readable string of characters, which may be descriptive.

Generation component 110 may be configured to generate secret codes, and/or other codes. One or more secret codes may be associated with one or more products. In some implementations, secret codes may be unique, such that different products are associated with different secret codes, and/or vice versa. In some implementations, all or some of an individual secret code may be randomized. For example, knowing or having a first secret code does not imply the content of a second secret code (nor make it easily guessable). In some implementations, one or more secret codes may be packaged in a packaging with one or more physical products. In some implementations, a secret code may be packaged in a packaging in a tamper-evident manner. As used herein, the term "tamper-evident" may refer to a packaging or seal (configured to seal a package or packaging) for which it is visually evident whether the packaging or seal has been opened. For example, in some implementations, a seal may be practically impossible to reconstruct once broken. In some implementations, a packaging or seal may be configured such that it is difficult to replicate. In some implementations, a packaging or seal may be difficult to replicate because a scan or photograph of the packaging or seal fails to capture enough details for a faithful reproduction and/or reconstruction. For example, in some implementations, a difficult-to-replicate packaging or seal may include a two-dimensional holographic image.

In some implementations, a secret code may be included in a packaging such that the secret code is hidden from view, in particular hidden when the packaging is unopened. For example, the packaging may be at least partially opaque. In some implementations, a secret code may be hidden under a scratch-off covering. In some implementations, a product identifier and/or other identifier may be included in a packaging of a product. In some implementations, a link or reference may be included in a packaging (e.g., a link or reference may be implemented as and/or embodied in a QR code) that links or refers to a product identifier and/or other identifiers.

In some implementations, generation component 110 may be configured to generate encrypted codes, including but not limited to one-way encrypted codes. In some implementations, encryption may be accomplished by a hashing function. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another (publicly available, documented, and/or implemented) hashing function. For example, an individual encrypted code may be generated by hashing a previously-generated secret code. In some implementations, an individual encrypted code may be generated by hashing a combination of different types of information. The different types of information may include one or more of a (previously-generated) secret code, a product identifier, an asset identifier (e.g., as created by asset component 112), and/or other information.

In some implementations, all or some functionality of generation component 110 may be performed by an external application 105, such as, e.g., a client application that may be available to producers (i.e. client computing devices associated with producers may execute the client application, and/or present the client application through one or more user interfaces 125). In some implementations, executable code that implements external application 105 may be stored in a publicly accessible manner and/or in an immutable manner, such as, by way of non-limiting example, in a content-addressable file system. In some implementations, a content-addressable file system may be the Inter-Planetary File System (IPFS). In some implementations, individual users 123 associated with individual client computing platforms 104 may be required to provide individual passwords to use external application(s) 105.

Asset component 112 may be configured to create assets, modify assets, and/or operate on assets. Assets may include code executable by (a blockchain implemented on) database 113. For example, an individual asset may be a smart contract recorded on a blockchain and/or stored on (decentralized) database 113. In some implementations, the executable code may be configured to instantiate and/or deploy objects in the runtime environment for smart contracts and other applications on a blockchain and/or code space. In some implementations, instantiated objects may include multiple classes of different types of objects. In some implementations, instantiated objects may have different types. In some implementations, a particular type of object may be an organization-controlled asset object, as described in U.S. Pat. No. 10,412,086 (and also referred to as asset in this disclosure). In some implementations, instantiated objects may have state, including but not limited to the values of constants, variables, data structures, and/or other information associated with the objects. The state of objects may include permanent information that cannot be modified by users 123 and non-permanent information that can be modified by (at least some of the) users 123. For example, a first object may have a first state, a second object may have a second state, a third object may have a third state, and so forth. In some implementations, at least some of the non-permanent information included in an object (e.g., included in a smart contract) may be protected from most types of modifications by most types of users, except for limited and restricted types of modifications through specific function calls by specific (authorized and/or authenticated) client applications, on behalf of specific users. In some implementations, the state for different types of objects may include different types of information. The state of individual objects may include individual object identifiers. In some implementations, the state of objects may include and/or refer to a list of device identifiers, device addresses, object identifiers, and/or other identifiers that list and/or identify computing devices and/or objects that are permitted to take certain actions, including but not limited to modifying states of objects.

Individual assets may be identified by asset identifiers. Individual assets may be associated with individual products. In some implementations, an individual asset identifier may be an address of the asset on the blockchain (e.g., for Ethereum). In some implementations, an individual asset identifier may be a name of the asset on the blockchain (e.g., for EOS). In some implementations, an individual asset identifier may be the same as an individual product identifier. In some implementations, a publicly available, documented, and/or implemented function and/or conversion may be used to derive the individual asset identifier from the individual product identifier, and/or vice versa. In some implementations, individual assets may represent ownership of one or more physical products. In some implementations, asset component 112 may be configured to record assets on a blockchain (and/or store the assets on database 113). In some implementations, asset component 112 may be configured to record codes (including but not limited to one-way encrypted codes) on a blockchain (and/or store the assets on database 113). Note that typically no particular secret codes are recorded on a blockchain (i.e., in smart contracts recorded on the blockchain), but one-way encrypted codes (that are based on the particular secret codes) may be stored in the smart contracts that are recorded on the blockchain. In some implementations, all or some functionality of asset component 112 may be performed by an external application 105, such as, e.g., a client application that may be available to producers (i.e. client computing devices associated with producers may execute the client application and/or present the client application through one or more user interfaces 125). For example, the functionality of recording encrypted codes in smart contracts may be restricted to specific function calls by specific (authorized and/or authenticated) client applications, on behalf of specific users (e.g., producing users, and not consumers). In some implementations, modifications of states of objects and/or assets may be responsive to a validation that a request from a user is authentic, e.g. based on one or more digital signatures.

Verification component 114 may be configured to receive requests from users 123, including but not limited to consumers. The requests may request one or more types of verification. In some implementations, verification component 114 may be configured to perform one or more types of verification, e.g., as requested. For example, a given request may a request to perform a given verification regarding a given physical product. In some implementations, a request may include a given (secret) code, one or more given identifiers (e.g., an asset identifier and/or a product identifier), and/or other information. For example, a consumer may physically possess a given physical product (identified by a given product identifier and/or associated with a given asset identifier) that includes (hidden within the packaging) a given secret code. In some implementations, a first type of verification may verify whether the given secret code corresponds to a particular one-way encrypted code that is stored in a given asset identified by the given asset identifier (and/or the given asset associated with the product identifier). In some implementations, verification component 114 may be configured such that receipt of a given request effectuates a given asset to perform one or more steps, including but not limited to one or more steps that implement and/or perform a given verification (on the blockchain). In some implementations, all or some functionality of verification component 114 may be performed by an external application 105, such as, e.g., a client application that may be available to consumers (i.e. client computing devices associated with consumers may execute the client application and/or present the client application through one or more user interfaces 125). In some implementations, a request received by verification component 114 may be implemented as a function call to a given asset and/or smart contract. Information included in such an implied request may be passed to the blockchain as one or more arguments of the function call. For example, in some implementations, a first function call to request verification may include as arguments a product identifier, a secret code, and/or other information. For example, in some implementations, a second function call to request verification may include as arguments an asset identifier, a secret code, and/or other information. Other types of function calls (using other combinations of arguments) are envisioned within the scope of this disclosure.

Encryption component 116 may be configured to generate encrypted codes based on secret codes. In some implementations, encryption component 116 may be configured to generate encrypted codes based on given secret codes, given asset identifiers, and/or other information. In some implementations, operations by encryption component 116 may be configured to be similar to the operations by generation component 110 in generating one-way encrypted codes (e.g., by applying one or more hashing functions to certain given information). In some implementations, operations by encryption component 116 may include one or more steps executed and/or executable by (a blockchain implemented on) database 113. For example, the one or more hashing functions may be executed by the blockchain. In some implementations, all or some functionality of encryption component 116 may be performed and/or launched by an external application 105, such as, e.g., a client application that may be available to consumers (i.e. client computing devices associated with consumers may execute the client application, which initiates function calls of a given smart contract on the blockchain).

Matching component 118 may be configured to determine whether certain information matches particular stored and/or recorded information, including but not limited to information stored in an asset. For example, matching component 118 may be configured to determine whether a given generated encrypted code (by encryption component 116) matches (e.g., is equal to) a previously generated encrypted code (by generation component 110) that is recorded in a given smart contract. In some implementations, operations by matching component 118 may include one or more steps executed and/or executable by (a blockchain implemented on) database 113. In some implementations, all or some functionality of matching component 118 may be performed and/or launched by an external application 105, such as, e.g., a client application that may be available to consumers (i.e. client computing devices associated with consumers may execute the client application, which initiates function calls of a given smart contract on the blockchain).

Notification component 120 may be configured to return and/or otherwise transmit notifications and/or other information to users 123, including but not limited to notifications responsive to requests. In some implementations, information may be transmitted to users 123 through one or more user interfaces 125. In some implementations, responses to requests may include semantic equivalents of "valid" and "invalid". For example, responsive to matching component 118 determining certain information does not match, notification component 120 may notify a user that a given verification failed, or that an attempt to determine a match failed. For example, responsive to matching component 118 determining certain information matches, notification component 120 may take several steps. In some implementations, several steps may be performed atomically and/or otherwise grouped in a way such that no other operations and/or functions may be performed on the same asset (or the same smart contract) until the several steps have been completed. The several steps may include transmitting a notification that a given verification succeeded, removing a given encrypted code from a given asset, and/or other steps. In some implementations, removing (or otherwise invalidating for future usage) a given encrypted code from a given asset may be performed by a specific function call of a given smart contract that modifies the state of the given smart contract. In some implementations, operations by notification component 120 may include one or more steps executed and/or executable by (a blockchain implemented on) database 113. A given encrypted code from a given asset may need to be removed (or must be removed) after one successful verification such that a subsequent attempt to request the same verification will fail.

In some implementations, all or some functionality of verification component 114, encryption component 116, matching component 118, and/or notification component 120 may be performed by a consumer-specific external application 105, such as, e.g., a client application that may be available to consumers (i.e. client computing devices associated with consumers may execute this client application).

Figure 3:
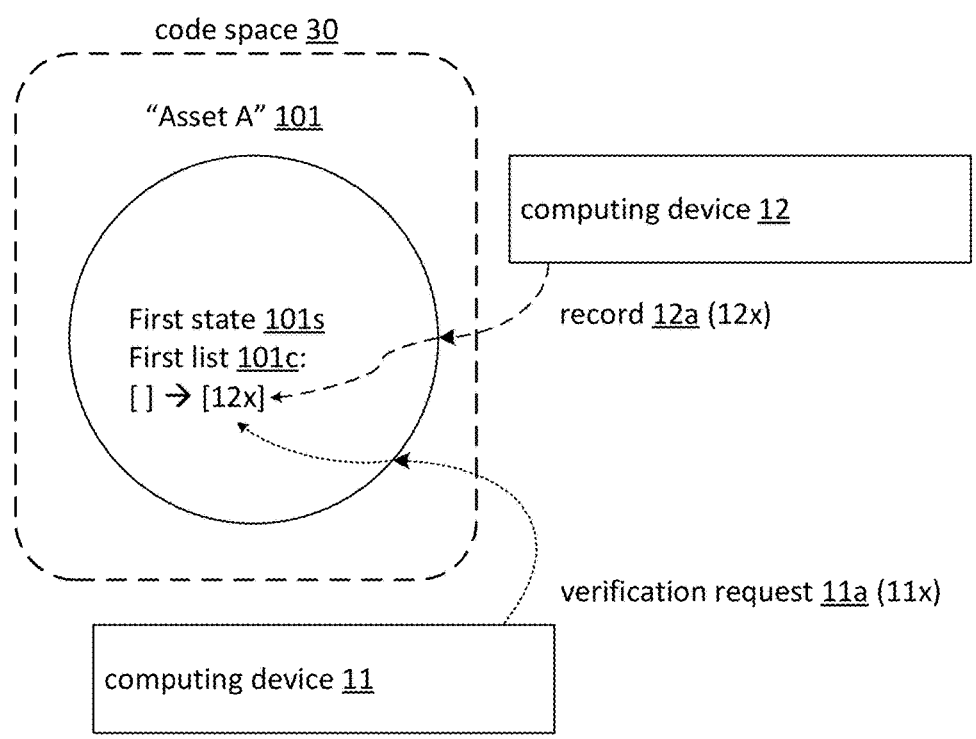
FIG. 3 illustrates an exemplary code space interacting with one or more computing devices, in accordance with one or more implementations of a system for providing a decentralized anti-counterfeit solution for supply chain tracking, in accordance with one or more implementations.

By way of non-limiting example, FIG. 3 illustrates an exemplary code space 30 interacting with one or more computing devices, in accordance with one or more implementations of system 100. As depicted, code space 30 interacts with a first computing device 11 (associated with a particular consumer) and a second computing device 12 (associated with a particular producer). Computing device 12 may interact with code space 30 by a function call 12a to record an encrypted code (here, labeled "record 12a" having an argument depicting an encrypted code 12x, labeled "12x") in a particular asset 101 (a smart contract labeled "Asset A", which may be associated with a particular physical product, distributed by the particular producer to the particular consumer). Asset 101 may have a first state 101s. First state 101s may include different types of information, including but not limited to a first list 101c of encrypted codes (this list may be empty prior to function call 12a) that may be used exactly once to provide supply chain tracking as described in this disclosure. By virtue of function call 12a as initiated by the particular producer, encrypted code 12x is added to first list 101c, so this list is no longer empty. Subsequently, (after the particular physical product has been distributed to the particular consumer) computing device 11 may interact with code space 30 by a function call 11a (labeled "verification request 11a") to request verification of an argument depicting a secret code 11x, labeled "11x". By virtue of function call 11a, as initiated by the particular consumer, executable code of asset 101 may verify whether secret code 11x, once encrypted, matches encrypted code 12x in first list 101c. Responsive to a match, function call 11a may return a semantic equivalent of "valid" to the particular consumer (i.e., the verification succeeded), and immediately remove encrypted code 12x from first list 101c (not depicted in FIG. 3). Alternatively, responsive to the encrypted version of secret code 11x failing to match encrypted code 12x, function call 11a may return a semantic equivalent of "invalid," such that the particular consumer is notified accordingly, e.g., through one or more user interfaces 125 (i.e., the verification failed, the supply chain tracking failed, and the particular consumer may as a result decline to trust the contents, quality, and/or integrity of the particular physical product, or, in other words, the particular consumer may be unable to demand accountability from the particular producer regarding this particular physical product).

Referring to FIG. 1, in some implementations, server(s) 102, client computing platform(s) 104, and/or external resources 122 may be operatively linked via one or more electronic communication links. For example, such electronic communication links may be established, at least in part, via one or more networks 13 such as, e.g., the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a computing device, and/or other computing platforms.

External resources 122 may include sources of information and/or functionality outside of system 100, external entities participating with system 100, external client applications, and/or other resources. In some implementations, functionality attributed herein to external resources 122 may be provided by resources included in system 100.

One or more external applications 105 may be configured to perform functionality as described herein for certain users, certain types of users, specific users, and/or other users. In some implementations, individual users may be required to provide individual passwords to use external application(s) 105. In some implementations, one or more external applications 105 may be configured to initiate, launch, and/or otherwise perform function calls of given smart contracts (and/or other assets) on the blockchain.

Server(s) 102 may include electronic storage 130, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 124, information received from server(s) 102, information received from client computing platform(s) 104, and/or other information that enables server(s) 102 and/or system 100 to function as described herein.

User interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, individual user interfaces 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, a user may enter requests (e.g., verification requests) as described herein, as may be received by verification component 114. In some implementations, a user may be provided with information resulting from a particular request, such as a notification from notification component 120. In some implementations, one or more user interfaces 125 may be included in one or more client computing platforms 104. In some implementations, one or more user interfaces 125 may be included in system 100.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, 118, and/or 120, and/or other components. Processor(s) 124 may be configured to execute components 108, 110, 112, 114, 116, 118, and/or 120, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and/or 120 are illustrated in FIG. 1 as being implemented within a single processing unit, in implementations in which processor(s) 124 includes multiple processing units, one or more of components 108, 110, 112, 114, 116, 118, and/or 120 may be implemented remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, and/or 120. As another example, processor(s) 124 may be configured to execute one or more additional components that may perform some or all of the functionality attributed below to one of components 108, 110, 112, 114, 116, 118, and/or 120.

Figure 2:
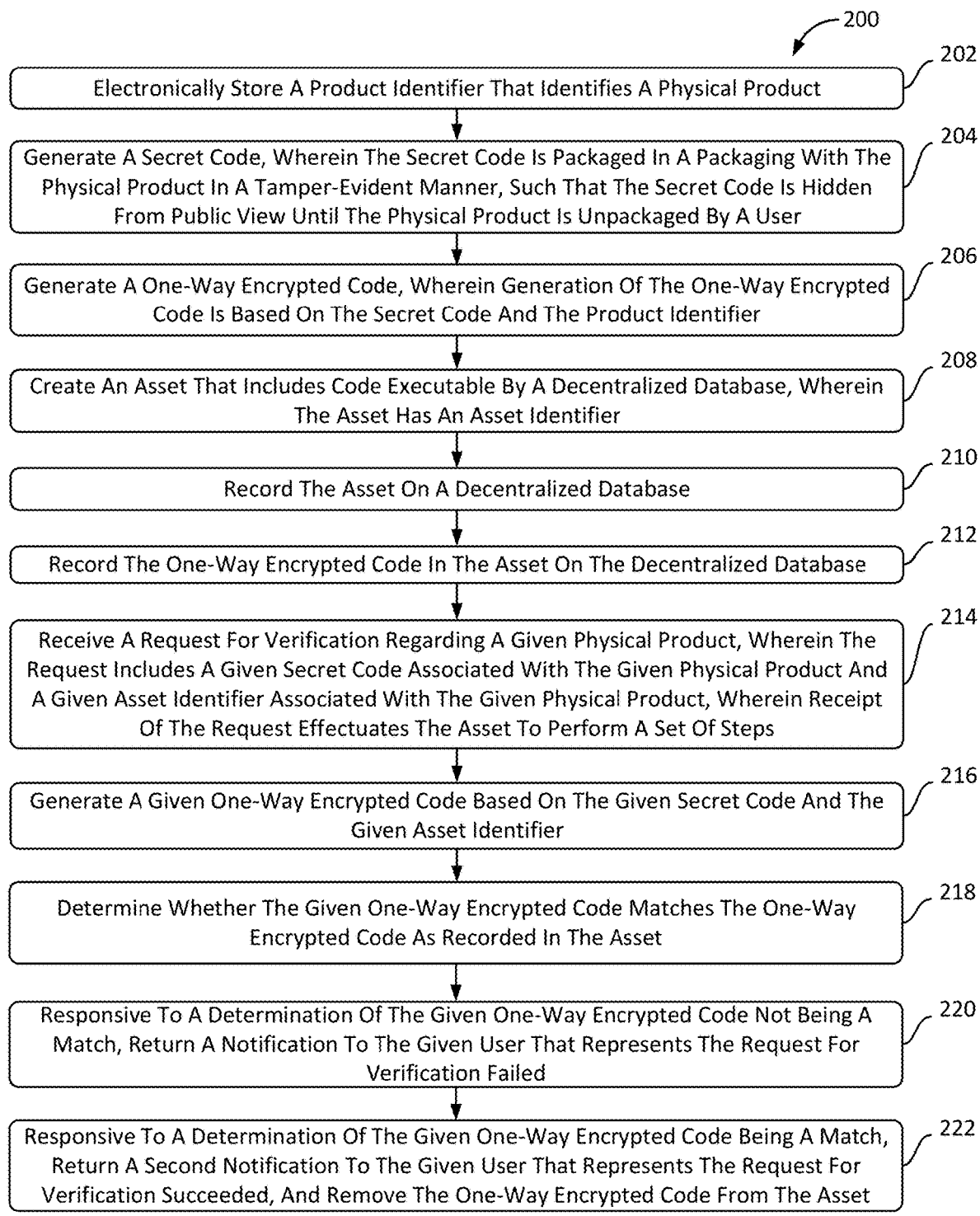
FIG. 2 illustrates a method for providing a decentralized anti-counterfeit solution for supply chain tracking, in accordance with one or more implementations.

FIG. 2 illustrates a method 200 for providing a decentralized anti-counterfeit solution for supply chain tracking, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored. The information includes a product identifier that identifies a physical product (e.g., produced and/or productized by a producer). In some embodiments, operation 202 is performed by a storage component the same as or similar to storage component 108 (shown in FIG. 1 and described herein).

At an operation 204, a secret code is generated. The secret code is packaged in a packaging with the physical product in a tamper-evident manner, such that the secret code is hidden from public view until the physical product is unpackaged by a user (e.g., the end-user or consumer). In some embodiments, operation 204 is performed by a generation component the same as or similar to generation component 110 (shown in FIG. 1 and described herein).

At an operation 206, a (one-way) encrypted code is generated. Generation of the encrypted code is based on the secret code and the product identifier (e.g., some combination and/or concatenation of different types of information). In some embodiments, operation 206 is performed by a generation component the same as or similar to generation component 110 (shown in FIG. 1 and described herein).

At an operation 208, an asset is created that includes code executable by a decentralized database. The asset has an asset identifier. The asset may represent ownership of and/or some other association with the physical product. In some embodiments, operation 208 is performed by an asset component the same as or similar to asset component 112 (shown in FIG. 1 and described herein).

At an operation 210, the asset is recorded on a decentralized database. In some embodiments, operation 210 is performed by an asset component the same as or similar to asset component 112 (shown in FIG. 1 and described herein).

At an operation 212, the encrypted code is recorded in the asset on the decentralized database. Operation 212 may be performed by an asset component the same as or similar to asset component 112 (shown in FIG. 1 and described herein).

At an operation 214, a request is received from a given user a request for verification regarding a given physical product. The request includes a given secret code associated with the given physical product and a given asset identifier associated with the given physical product. Receipt of the request effectuates the asset to perform a set of steps. In some embodiments, operation 214 is performed by a verification component the same as or similar to verification component 114 (shown in FIG. 1 and described herein).

At an operation 216, a given one-way encrypted code is generated based on the given secret code and the given asset identifier. In some embodiments, operation 216 is performed by an encryption component the same as or similar to encryption component 116 (shown in FIG. 1 and described herein).

At an operation 218, it is determined whether the given one-way encrypted code is a match of the one-way encrypted code as recorded in the asset. In some embodiments, operation 218 is performed by a matching component the same as or similar to matching component 118 (shown in FIG. 1 and described herein).

At an operation 220, responsive to a determination of the given one-way encrypted code not being a match, a notification is returned to the given user that represents the request for verification failed. In some embodiments, operation 220 is performed by a notification component the same as or similar to notification component 120 (shown in FIG. 1 and described herein).

At an operation 222, responsive to a determination of the given one-way encrypted code being a match, a second notification is returned to the given user that represents the request for verification succeeded, and further removing the one-way encrypted code from the asset. Operation 222 may be performed by a notification component the same as or similar to notification component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing a decentralized anti-counterfeit solution for supply chain tracking of physical products, the system comprising:
    a server including electronic storage and one or more hardware processors, wherein the electronic storage is configured to electronically store machine-readable instructions, and wherein the one or more hardware processors are configured to execute the machine-readable instructions to:

obtain information, wherein the information includes a product identifier that identifies a physical product, wherein the product identifier is a sequence of alphanumerical characters;

generate a secret code, wherein the secret code is packaged in a packaging with the physical product in a tamper-evident manner, such that the secret code is hidden from public view until the physical product is unpackaged by a user, wherein the packaging that includes the physical product includes product-specific information regarding the physical product, wherein the physical product reaches a given user by transfer along a supply chain;

generate a single-use one-way encrypted code, wherein generation of the single-use one-way encrypted code is based on the secret code and the product identifier, and wherein the generation of the single-use one-way encrypted code uses a hashing function;

record an asset on a blockchain, wherein the asset is a smart contract, wherein the asset has an asset identifier, wherein the asset represents ownership of the physical product, wherein the asset identifier is a particular sequence of alphanumerical characters, wherein the asset includes the single-use one-way encrypted code, and wherein the smart contract includes one or more functions;

receive, from the given user, a request for verification regarding a given physical product, wherein the request includes a given secret code associated with the given physical product and a given asset identifier associated with the given physical product; and subsequent to receipt of the request for verification:
(i) generate a given one-way encrypted code based on the given secret code and the given asset identifier, wherein generation of the given one-way encrypted code uses the hashing function;
(ii) make a determination whether the given one-way encrypted code matches the single-use one-way encrypted code included in the asset; and
(iii) responsive to the determination of the given one-way encrypted code matching the single-use one-way encrypted code, return a notification to the given user that represents the request for verification succeeded, and further inactivate and/or remove the single-use one-way encrypted code included in the asset such that a future request for verification using the same single-use one-way encrypted code will fail.

2. The system of claim 1, wherein making the determination whether the given one-way encrypted code matches the single-use one-way encrypted code is performed by the one or more functions included in the smart contract.

3. The system of claim 1, wherein generating the given one-way encrypted code is performed by the one or more functions included in the smart contract.

4. The system of claim 1, wherein the physical product is a pharmaceutical product produced by a producing user, wherein the physical product is distributed from the producing user along the supply chain, wherein the given user is a consuming user downstream in the supply chain from the producing user.

5. The system of claim 1, wherein execution of code of the asset instantiates objects having states, the objects being instantiated within a code space of the blockchain.

6. The system of claim 1, wherein the packaging is sealed with a tamper-evident seal that includes a two-dimensional holographic image.

7. The system of claim 1, wherein generation of the single-use one-way encrypted code is initiated by a client application that is being executed on a client computing device that is associated with a producing user.

8. The system of claim 1, wherein the request for verification is received from a client application that is being executed on a client computing device.

9. The system of claim 1, wherein the product identifier is the same as the asset identifier.

10. The system of claim 1, wherein the asset identifier is derived from the product identifier using a mathematical function.

11. The system of claim 1, wherein the product identifier is derived from the asset identifier using a mathematical function.

12. The system of claim 1, wherein the hashing function operates on a combination of the secret code and the product identifier.

13. The system of claim 1, wherein one or both of the asset identifier and the product identifier are included in the packaging of the physical product such that one or both of the asset identifier and the product identifier are not hidden from public view.

14. The system of claim 1, wherein the asset is implemented as a smart contract, wherein the single-use one-way encrypted code is included in the asset as an element in a list, wherein elements of the list are private variables of the smart contract.

15. A method for providing a decentralized anti-counterfeit solution for supply chain tracking, the method being implemented by a server that includes one or more hardware processors, the method comprising:

electronically storing information, by the server, wherein the information includes a product identifier that identifies a physical product, wherein the product identifier is a sequence of alphanumerical characters;

generating a secret code, by the server, wherein the secret code is packaged in a packaging with the physical product in a tamper-evident manner, such that the secret code is hidden from public view until the physical product is unpackaged by a user, wherein the packaging that includes the physical product includes product-specific information regarding the physical product, wherein the physical product reaches a given user by transfer along a supply chain;

generating a single-use one-way encrypted code, by the server, wherein generation of the single-use one-way encrypted code is based on the secret code and the product identifier, and wherein the generation of the single-use one-way encrypted code uses a hashing function;

recording, by the server, an asset on a blockchain, wherein the asset is a smart contract, wherein the asset has an asset identifier, wherein the asset represents ownership of the physical product, wherein the asset identifier is a particular sequence of alphanumerical characters, wherein the asset includes the single-use one-way encrypted code, and wherein the smart contract includes one or more functions;

receiving, from the given user, a request for verification, by the server, regarding a given physical product, wherein the request includes a given secret code associated with the given physical product and a given asset identifier associated with the given physical product; and subsequent to receipt of the request for verification:

(i) generating a given one-way encrypted code based on the given secret code and the given asset identifier, wherein generation of the given one-way encrypted code uses the hashing function;

(ii) making a determination whether the given one-way encrypted code matches the single-use one-way encrypted code included in the asset; and (iii) responsive to the determination of the given one-way encrypted code matching the single-use one-way encrypted code, returning a notification to the given user that represents the request for verification succeeded, and further inactivating and/or removing the single-use one-way encrypted code included in the asset such that a future request for verification using the same single-use one-way encrypted code will fail.

16. The method of claim 15, wherein making the determination whether the given one-way encrypted code matches the single-use one-way encrypted code is performed by the one or more functions included in the smart contract.

17. The method of claim 15, wherein generating the given one-way encrypted code is performed by the one or more functions included in the smart contract.

18. The method of claim 15, wherein generating the single-use one-way encrypted code is associated with a producing user.

19. The method of claim 15, wherein receiving the request for verification is received from a client application that is being executed on a client computing device.

20. The method of claim 15, wherein the hashing function operates on a combination of the secret code and the product identifier.

* * * * *